(12) United States Patent
Obbens et al.

(10) Patent No.: US 6,173,642 B1
(45) Date of Patent: Jan. 16, 2001

(54) BREWING DEVICE FOR PREPARING COFFEE OR TEA

(75) Inventors: Stephanus Henricus Maria Obbens, Valkenswaard; Joris Gerardus Hendriks, Son, both of (NL); Reinhard Lansche, Schriesheim (DE)

(73) Assignee: Spengler Getränkemaschinen GmbH, Bruchsal (DE)

( * ) Notice: Under 35 U.S.C. 154(b), the term of this patent shall be extended for 0 days.

(21) Appl. No.: 09/449,599

(22) Filed: Nov. 29, 1999

(30) Foreign Application Priority Data

Dec. 1, 1998 (DE) .............................. 198 55 271

(51) Int. Cl.[7] .............................. A47J 31/34; A47J 31/36
(52) U.S. Cl. ........................ 99/280; 99/289 R; 99/300; 99/307; 99/304; 99/279
(58) Field of Search ............................ 99/279, 280, 287, 99/289 R, 300, 302 R, 302 P, 304, 306, 307

(56) References Cited

U.S. PATENT DOCUMENTS 5,302,407 * 4/1994 Vetterli ........................... 99/289 R X
5,501,138 * 3/1996 Fava ................................ 99/289 R X

* cited by examiner

Primary Examiner—Reginald L. Alexander
(74) Attorney, Agent, or Firm—Collard & Roe, PC (57) ABSTRACT

A brewing device for preparing coffee or tea comprises a cylinder housing defining a cylindrical brewing chamber. The cylinder housing has two pivot pins arranged centrally between the top and bottom ends of the cylinder housing, and projecting from opposite sides of the cylinder housing orthogonally to the axis. The opposite sides have vertically extending, flat surfaces defining homologous cam tracks. A sprinkler body is movable into and out of a position for closing the top end of the cylinder housing, and a sieve body is movable into and out of a position for closing the bottom end of the cylinder housing. Cam disks are rotatably mounted on the pivot pins for controlling the sprinkler body movement, the cam disks defining further cam tracks.

15 Claims, 12 Drawing Sheets

BREWING DEVICE FOR PREPARING COFFEE OR TEA

BACKGROUND OF THE INVENTION

1. Field of the Invention

The present invention relates to a brewing device for preparing coffee or tea.

2. Description of the Prior Art

Brewing devices for preparing coffee or tea, which comprise a cylinder housing defining a cylindrical chamber, and a sprinkler body and a sieve body movable by a cam disk into and out of a position to close the top and bottom ends of the cylindrical chamber, are known.

In automatic dispensers for freshly brewed hot drinks, such as coffee, espresso or tea, the brewing device is one of the most important components. It decisively determines the quality of the drink. The known brewing devices are relatively large, have many parts and a complex structure, and are difficult to clean.

SUMMARY OF THE INVENTION

It is the primary object of this invention to provide a very compact brewing device which has relatively few parts, few places that can be clogged, and is easy to handle and to clean.

The above and other objects are accomplished by the invention with a brewing device for preparing coffee or tea, which comprises a cylinder housing having a top end and a bottom end, and defining a cylindrical brewing chamber having an axis, the cylinder housing having two pivot pins arranged centrally between the top and bottom ends, and projecting from opposite sides of the cylinder housing orthogonally to the axis, the opposite sides having vertically extending, flat surfaces, and the flat surfaces defining homologous cam tracks. The brewing device further comprises a sprinkler body movable into and out of a position for closing the top end of the cylinder housing, a sieve body movable into and out of a position for closing the bottom end of the cylinder housing, and cam disks rotatably mounted on the pivot pins for controlling the sprinkler body movement, the cam disks defining further cam tracks.

The compact construction of the brewing device is due particularly to the fact that the cylindrical brewing chamber is centrally located and the operational parts of the device surround the cylindrical brewing chamber. It is further enhanced by the fact that the sprinkler body is lifted only minimally from the cylindrical brewing chamber when it is moved out of the closing position by being pivoted in a radial movement. In addition, the sieve body may be vertically displaced downwardly parallel to the axis of the cylindrical brewing chamber so that the residual coffee grinds or tea leafs may be removed from the sieve body by a transversely displaceable wiper. However, it would also be possible to move the sieve body radially along a stationary wiper for this purpose. The control elements for moving the sprinkler body and the sieve body are arranged at opposite sides of the cylindrical brewing chamber and they are covered so that the outer contours of the device have only smooth surfaces. The required drive means and sensors are screened behind a cover plate. The brewing device may be dismounted from a wall or a mounting plate on which it is detachably held, and may be cleaned in a dish washer without its electrical parts.

BRIEF DESCRIPTION OF THE DRAWING

The above and other objects, advantages and features of the invention will become more apparent from the following detailed description of certain now preferred embodiments, taken in conjunction with the accompanying drawing wherein.

DETAILED DESCRIPTION OF THE PREFERRED EMBODIMENTS

In the drawing, like reference numerals designate like parts functioning in a like manner in all figures.

Figure 1:
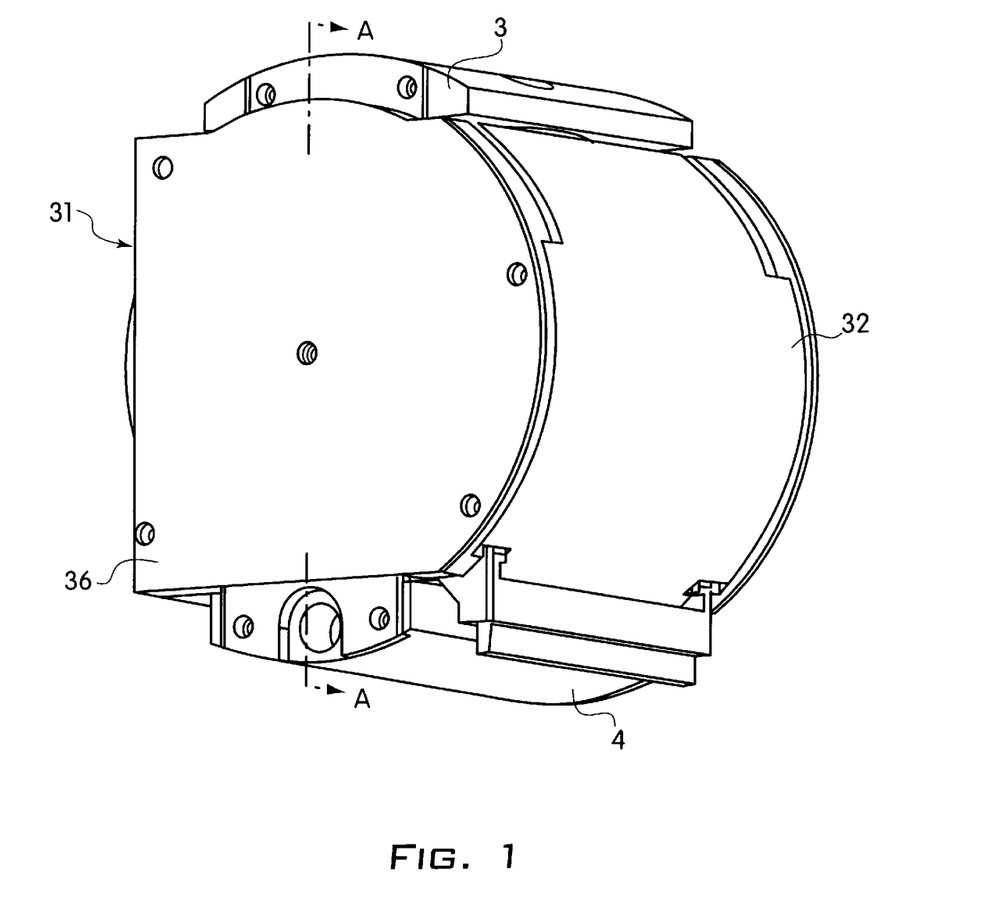
FIG. 1 is a perspective view of one embodiment of a brewing device according to the present invention.
Figure 2:
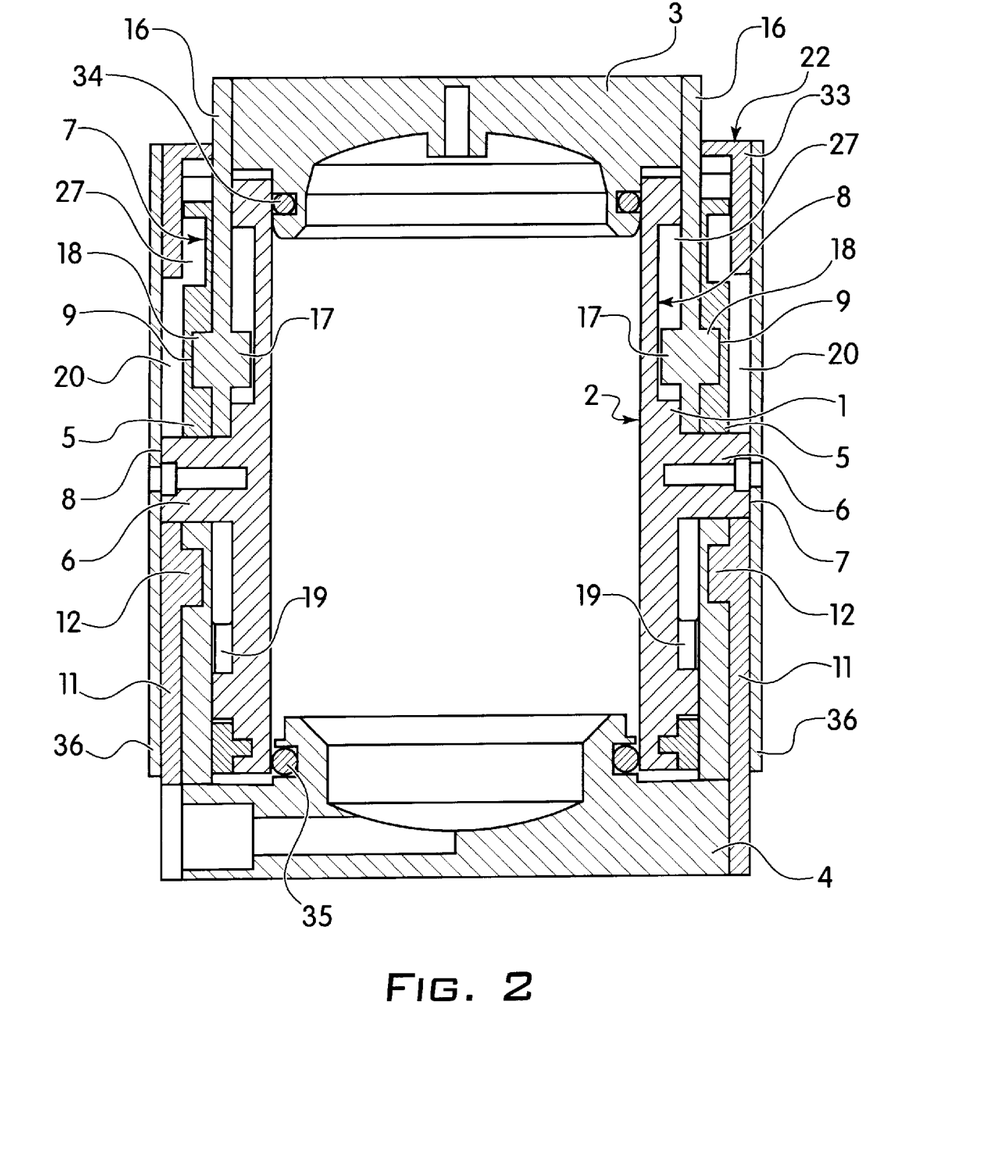
FIG. 2 is a sectional view along line A—A of FIG. 1.
Figure 3:
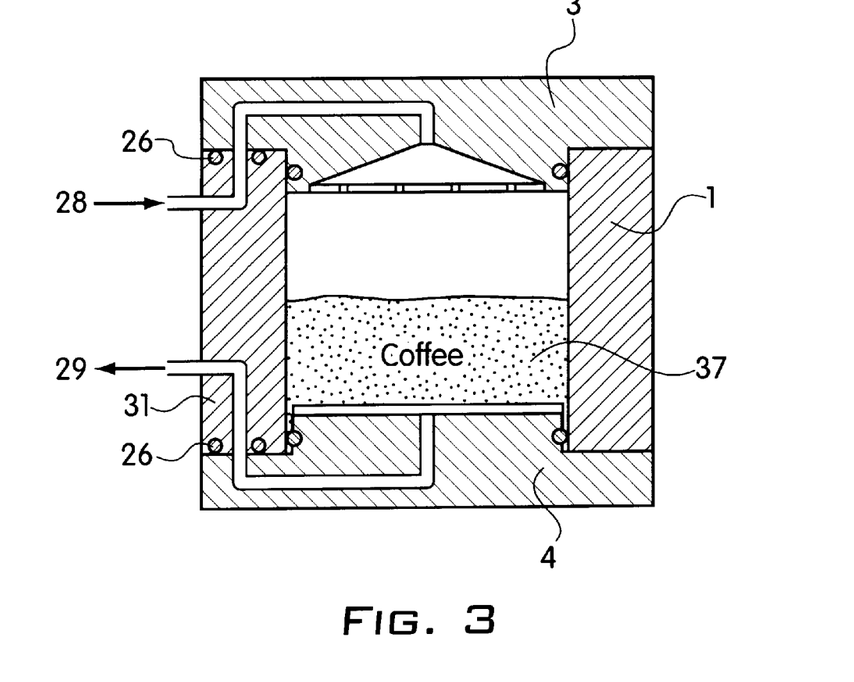
FIG. 3 is a sectional view showing a conduit for the brewing water at the top end of the cylindrical brewing chamber and a conduit for dispensing the brewed drink at the bottom end of the cylindrical chamber.
Figure 4:
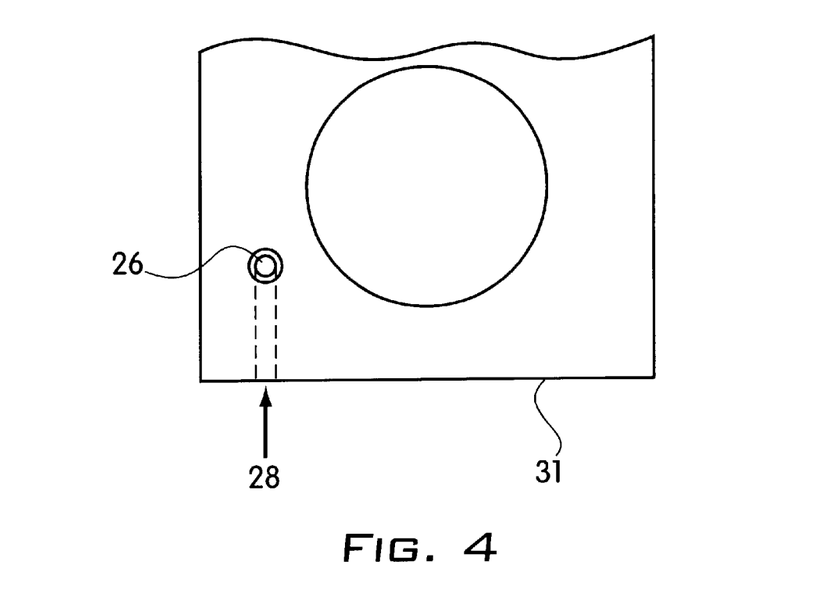
FIG. 4 is a fragmentary top view of the cylinder housing.
Figure 5:
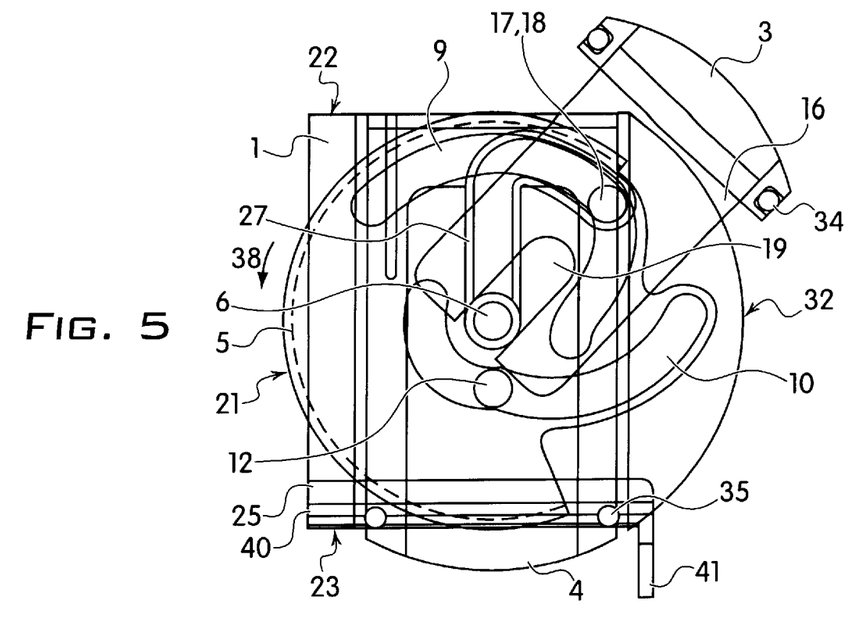
FIGS. 5 to 8 schematically illustrate the successive stages in the preparation of the coffee or tea.

Referring first to FIGS. 1—8 and 18, there is shown a brewing device for preparing coffee or tea, according a one embodiment of this invention. The brewing device comprises substantially cubic cylinder housing 1 having a top end 22 and a bottom end 23. The cylinder housing defines cylindrical brewing chamber 2 having an axis, and has flat rear wall 31 extending parallel to the cylindrical brewing chamber axis. The rear cylinder housing wall may be detachably mounted on a wall or a mounting plate. The top and bottom ends of the cylinder housing extend perpendicular to the cylindrical brewing chamber axis, and cylindrically curved front wall 32 of the cylinder housing merges into the top and bottom ends of the cylinder housing. Flat side walls 33 extend perpendicularly to rear wall 31 towards front wall 32 at opposite sides of cylindrical brewing chamber 2. As shown in FIGS. 1 and 2, side walls 33 are covered by plates 36, and as shown in FIG. 5, the cam disk may have a serrated circumference 21.

Cylinder housing 1 has two pivot pins 6 arranged centrally between top and bottom ends 22, 23 and projecting from opposite sides of the cylinder housing orthogonally to the axis of cylindrical brewing chamber 2 and perpendicularly to side walls 33. The opposite sides have vertically extending, flat surfaces 8 defining homologous cam tracks 27. Sprinkler body 3 is movable into and out of a position for closing the top end of the cylinder housing, and sieve body 4 is movable into and out of a position for closing the bottom end of the cylinder housing. Cam disks 5 are rotatably mounted on pivot pins 6 for controlling the sprinkler body movement, and the further cam tracks in cam disks are shown at 9 and 10.

As shown in FIGS. 5 to 8, sprinkler body 3 is pivotal about pivot pins 6 into and out of a closing position to close the top of cylinder housing 1. Preferably, circumferentially extending gasket 34 is mounted in a groove in the sprinkler body to seal cylindrical brewing chamber 2 when the sprinkler body is in the closed position. Advantageously, sprinkler body 3 has two legs 16 arranged on opposite sides thereof, the legs having lugs 17, 18 respectively engaging homologous cam tracks 27 in flat surfaces 8 of cylinder housing 1 and further cam tracks 9 in cam disks 5 for moving sprinkler body 3 into and out of the closing position. As shown in the preferred embodiments, legs 16 also have elongated slots 19 extending substantially parallel to the axis of the cylindrical brewing chamber and guided by pivot pins 6. Further cam tracks 9 are arranged at an inside of cam disks 5 facing legs 16.

In the embodiment of FIGS. 1 to 8 and 18, cam disks 5 also control the movement of sieve body 4 to close the bottom end of cylinder housing 1. In this embodiment, the sieve body has two legs 11 arranged on opposite sides thereof, the legs having inwardly directed lugs 12 engaging further cam tracks 10 in cam disks 5, and these cam tracks are configured to move the sieve body substantially parallel to the axis of the cylindrical brewing chamber. Advantageously, legs 11 also have elongated slots 20 extending from free ends thereof substantially parallel to the axis of cylindrical brewing chamber 2 and guided by pivot pins 6 engaging slots 20. Cam tracks 10 are arranged at an outside of cam disks 5 facing legs 11. Similarly to sprinkler body 3, the sieve body also has a circumferentially extending gasket 35 to provide a seal between the sieve body and cylinder housing 1 when the sieve body is in the closed position.

The movement of the sprinkler and sieve bodies is controlled in the manner illustrated in FIGS. 5 to 8 by cam disks 5 mounted on pivot pins 6, the outside of the cam disks defining cam tracks 10 engaged by lugs 12 and the inside of the cam disks defining cam tracks 9 engaged by lugs 18, while lugs 17 of legs 16 engage cam track 27 in cylindrical housing 1. Legs 16 are in gliding contact with flat surfaces 8 of cylinder housing 1, lugs 17 extending inwardly and lugs 18 outwardly from the legs. Slots 19 in legs 16 engage pivot pins 6 and are guided thereby.

Figure 18:
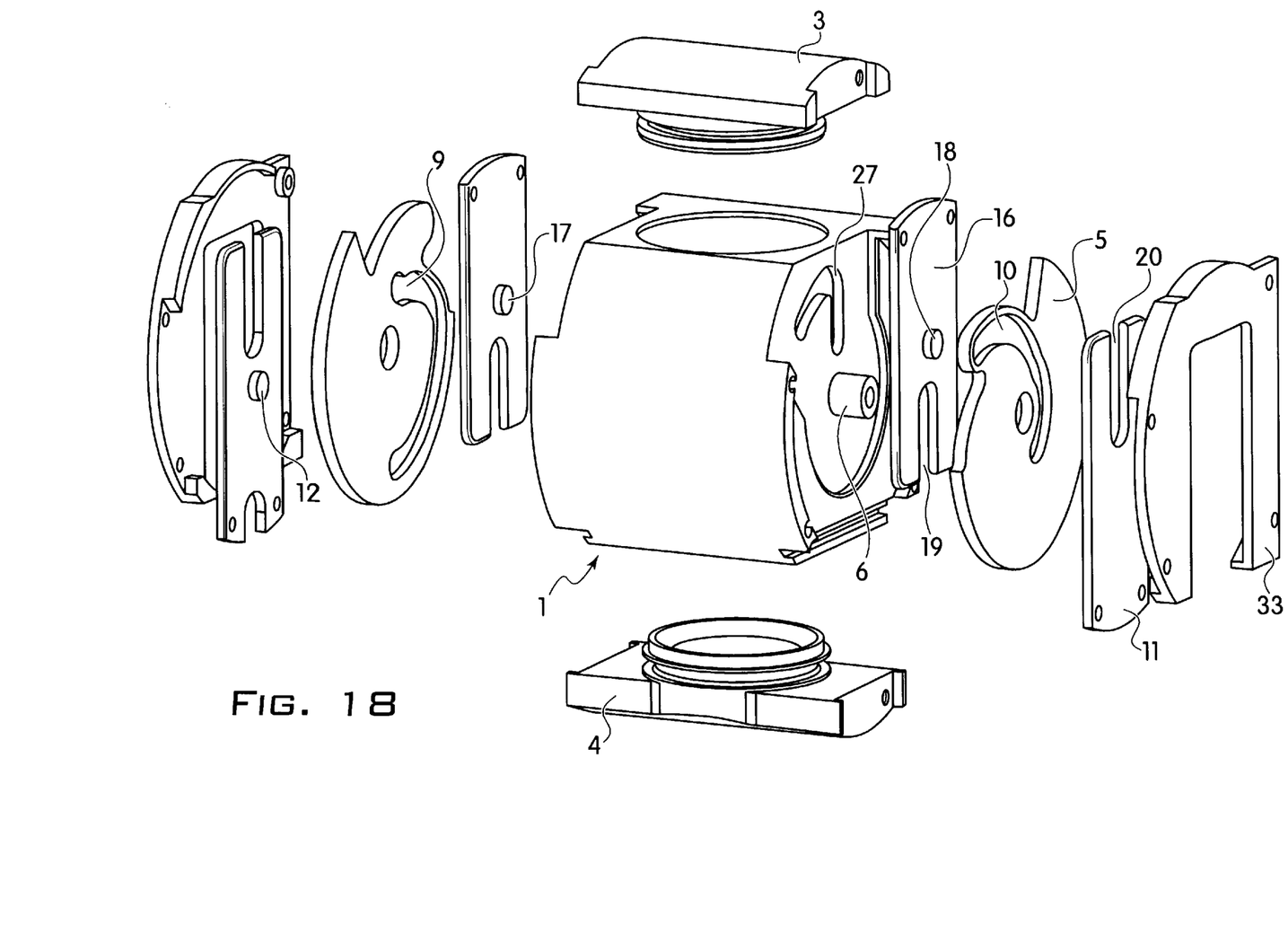
FIG. 18 is an exploded perspective view of the brewing device shown in FIGS. 1 to 8.

As best shown in FIGS. 2 and 18, legs 16 of sprinkler body 3 are mounted on the pivot pins, and cam disks 5 are rotatably mounted on pivot pins 6 outwardly of, and adjacent to, the sprinkler body legs. Legs 11 of sieve body 9 are mounted on the pivot pins outwardly of, and adjacent to, the outside of cam disks 5, and lugs 12 extending inwardly from legs 11 engage, and are guided in, cam track 10 of cam disks 5. Plates 36 covering cylinder housing side walls 33 define a channel with cam disk 5 for guiding legs 11 parallel to the axis of cylindrical brewing chamber 2, as best shown in FIG. 2.

Advantageously, and as illustrated in FIGS. 3 and 4, the brewing device further comprises conduit 28 for supplying brewing water to cylindrical brewing chamber 2. The conduit passes through rear wall 31 of cylinder housing 1 and sprinkler body 3 so that the water is sprinkled or dripped into the cylindrical brewing chamber. Ground or powdered coffee 37 is placed in the cylindrical brewing chamber 2, and the brewed coffee is dispensed through conduit 29 passing through sieve body 4 and rear wall 31 of the cylinder housing. Elastomer gaskets 26 are arranged between cylinder housing 1 and sprinkler body 3 and sieve body 4.

The successive stages of the operation of the brewing device are illustrated in FIGS. 5 to 8. FIG. 5 shows the stage of operation before the coffee or tea is placed in cylindrical brewing chamber 2 when sieve body 4 closes the bottom end of cylinder housing 1 while sprinkler body 3 has been moved out of the closing position. As shown, the sprinkler body has been pivoted into its wide open position, in which lugs 17 and 18 are at one end of cam tracks 27 and 9. Legs 16 of the sprinkler body are guided by slots 19 engaging pivot pins 6.

Figure 6:
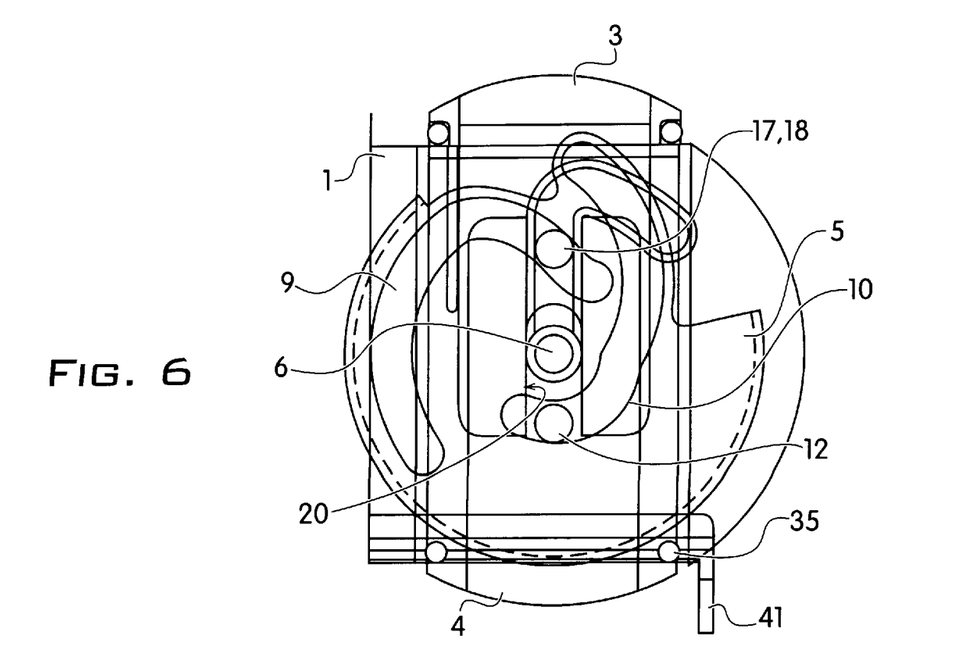

FIG. 6 illustrates the next stage in which brewing of the coffee or tea begins. Cam disks 5 have been rotated counterclockwise in the direction of arrow 38 (FIG. 5) to pivot sprinkler body 3 into alignment with the axis of cylindrical brewing chamber 2 but in a position in which it is axially spaced from the top end of cylinder housing 1. In the stages shown in FIGS. 5 and 6, lug 12 is so guided in cam track 10 that sieve body 4 remains in the closed position.

Figure 7:
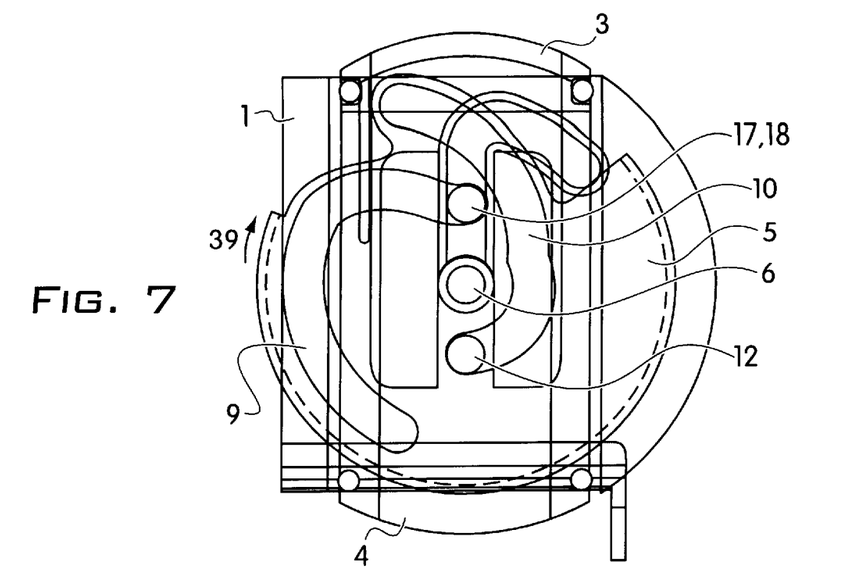

FIG. 7 shows the next stage in which the coffee or tea is brewed. In this stage, cam disks 5 have been further rotated in the direction of arrow 38 until lugs 17, 18 are at the opposite ends of cam tracks 27, 9. At this stage, sprinkler body 3 and sieve body 4 are in the closed position.

Figure 8:
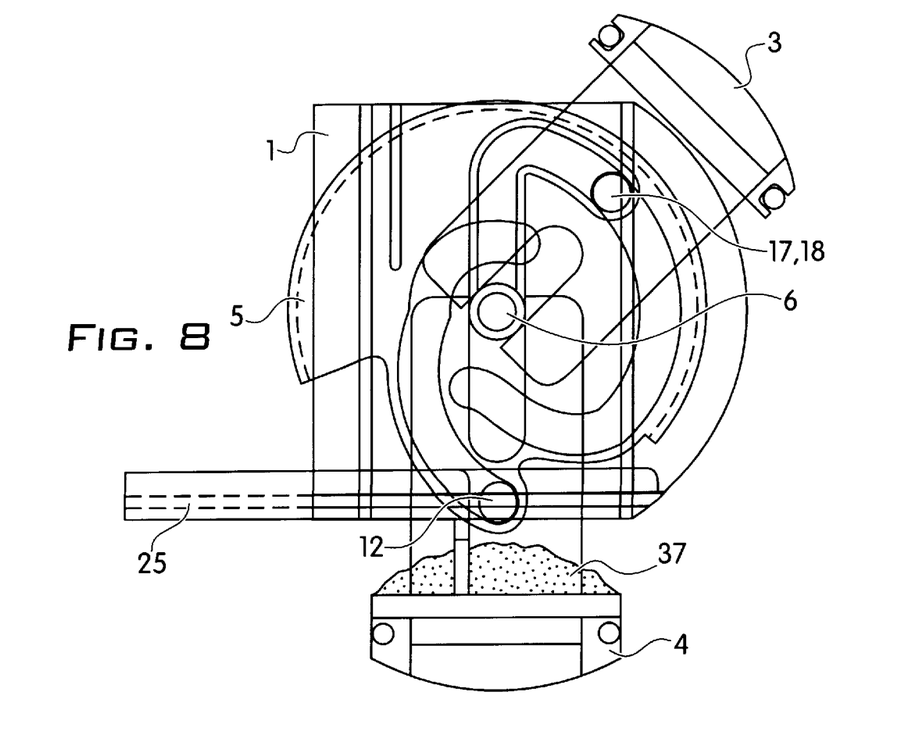

After the brewed coffee or tea has been dispensed, cam disks 5 are rotated clockwise (see arrow 39 in FIG. 7) until the end positions of the sprinkler body and the sieve body shown in FIG. 8 has been reached. During this operational stage, sprinkler body 3 is first moved axially above the top end of cylinder housing 1, which position is shown in FIG. 6, and then pivoted away into the same position as shown in FIG. 5. At the same time, sieve body 4 is displaced axially downwardly away from the bottom end of cylinder housing 1. This makes it possible to remove coffee grinds 37 from the sieve body. For this purpose, wiper 25 is transversely displaceably mounted on gliding track 40 at bottom end 23 of cylinder housing 1. The wiper has a flexible scraper 41, for instance of an elastomeric material, which may be moved along a surface of the sieve body supporting the coffee or tea.

As shown in FIGS. 5 to 8, cam disks 5 may have a serrated circumference 21, and these serrated circumferences may project beyond rear wall 31 of cylinder housing 1. They may be engaged by drive means (not shown) for rotating the cam disks. If desired, the drive means may be coupled with a drive for transversely displacing wiper 25 so that the operating stages may be automatically controlled.

FIGS. 9 to 17 illustrate another embodiment of the brewing device, which is particularly useful for the preparation of espresso. Identical reference numerals designate like parts operating in a like manner, making a description of such parts unnecessary. The movement of sprinkler body 3 is controlled in the same manner as described hereinabove in connection with the embodiment shown in FIGS. 1 to 8 and 18. However, the sieve body movement is not controlled by cam disks 5 but by piston 13 which is movable parallel to the axis of cylindrical brewing chamber 2 for moving the sieve body into and out of the closing position. As shown in FIGS. 12 to 17, drive means may be provided for moving the piston. The illustrated drive means comprises spindle 14 extending from piston 13 and meshing with the internal thread of gear 15 mounted in cylinder housing 1 and driven by drives 42, arranged outside the cylinder housing. Piston 13 is axially displaced into and out of a closing position.

Figure 9:
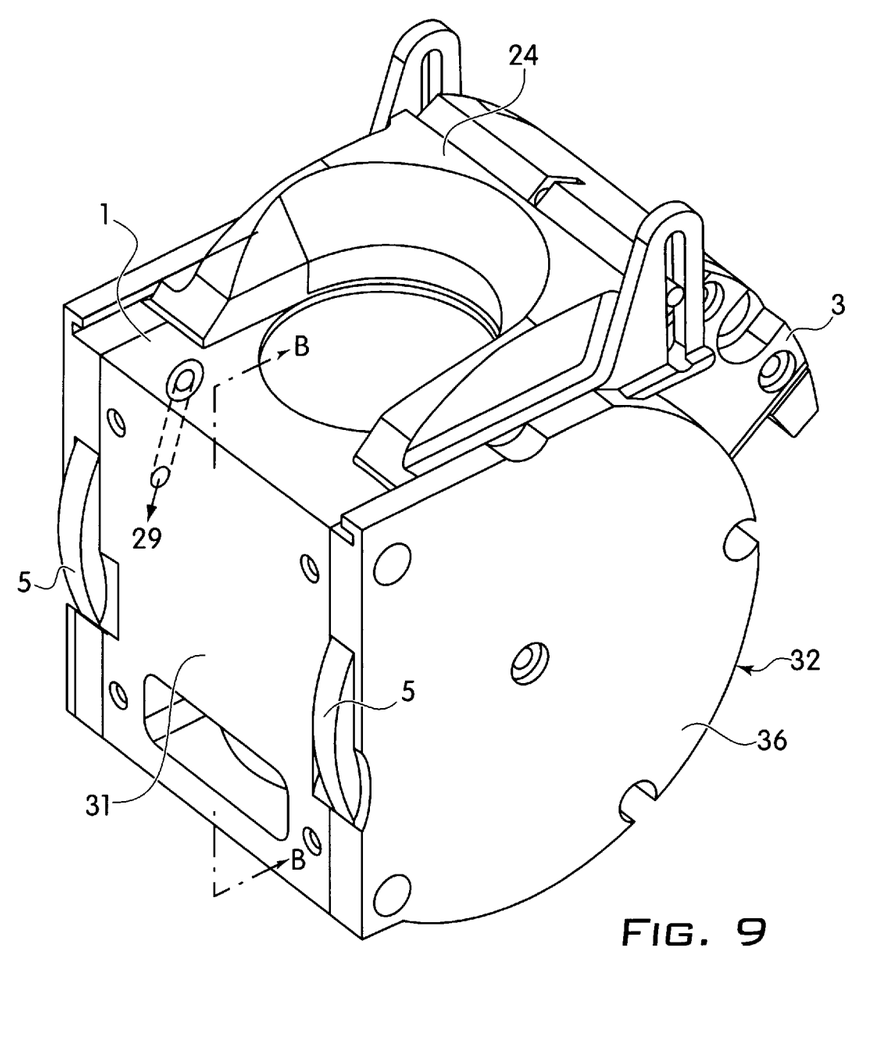
FIG. 9 is a perspective view of another embodiment of the brewing device for preparing espresso.
Figure 10:
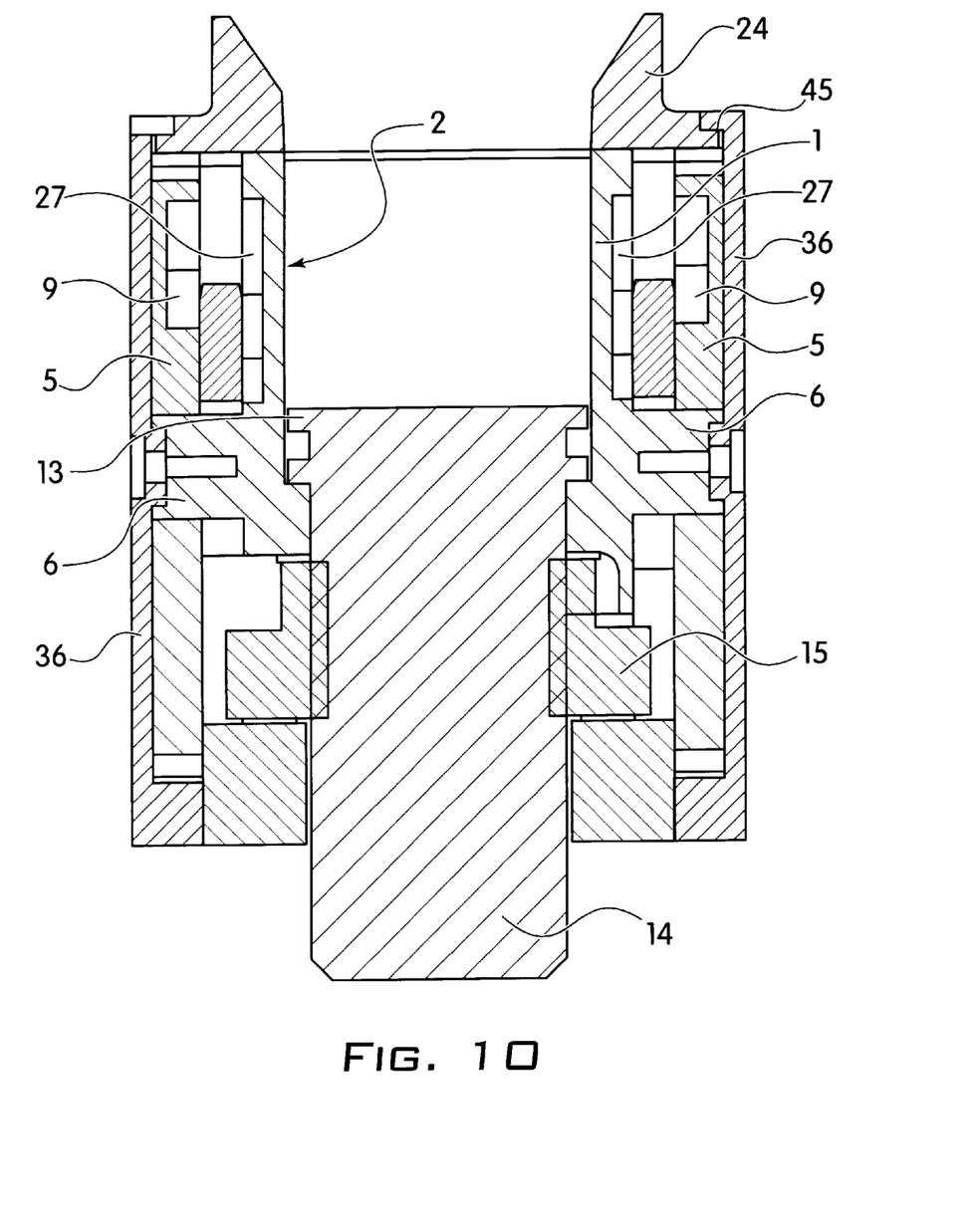
FIG. 10 is a section along line B—B of FIG. 9.
Figure 12:
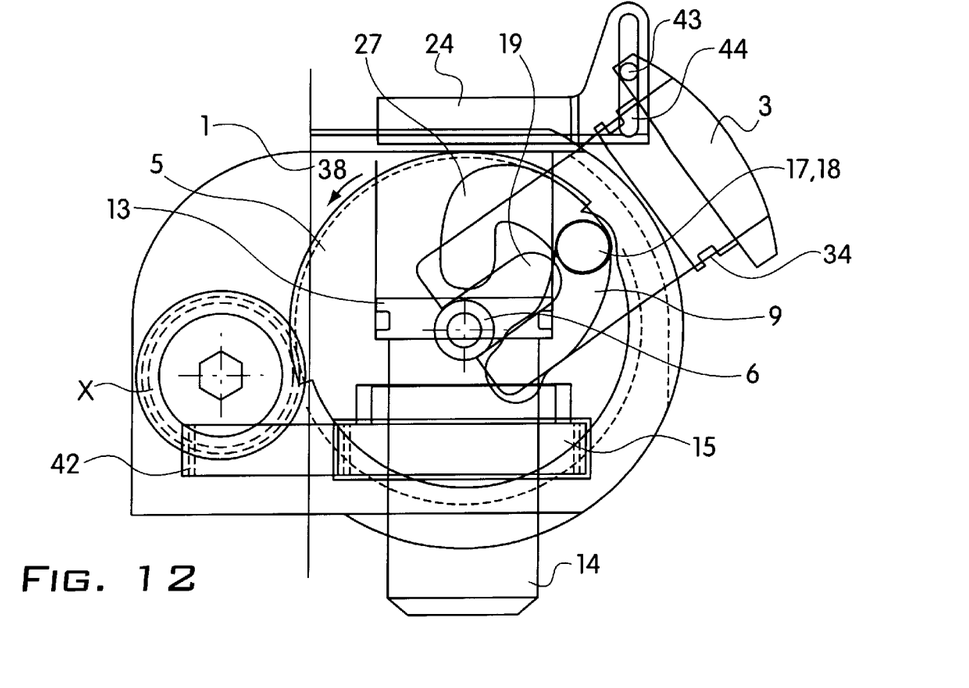
FIGS. 12 to 17 schematically illustrate the successive stages in the preparation of the espresso.

After the brewed espresso has been dispensed, the used coffee grinds 37 may be removed by transversely displaceable wiper 24 at the top end of cylinder housing 1. The wiper is pivoted to a side of sprinkler body 3, as best shown in FIGS. 9 and 12. Wiper 24 is actuated by sprinkler body 3 which has a coupling pin 43 engaging elongated slot 44 in the wiper to connect the wiper to the sprinkler body. The wiper is guided in gliding track 45 of cylinder housing 1.

Figure 11:
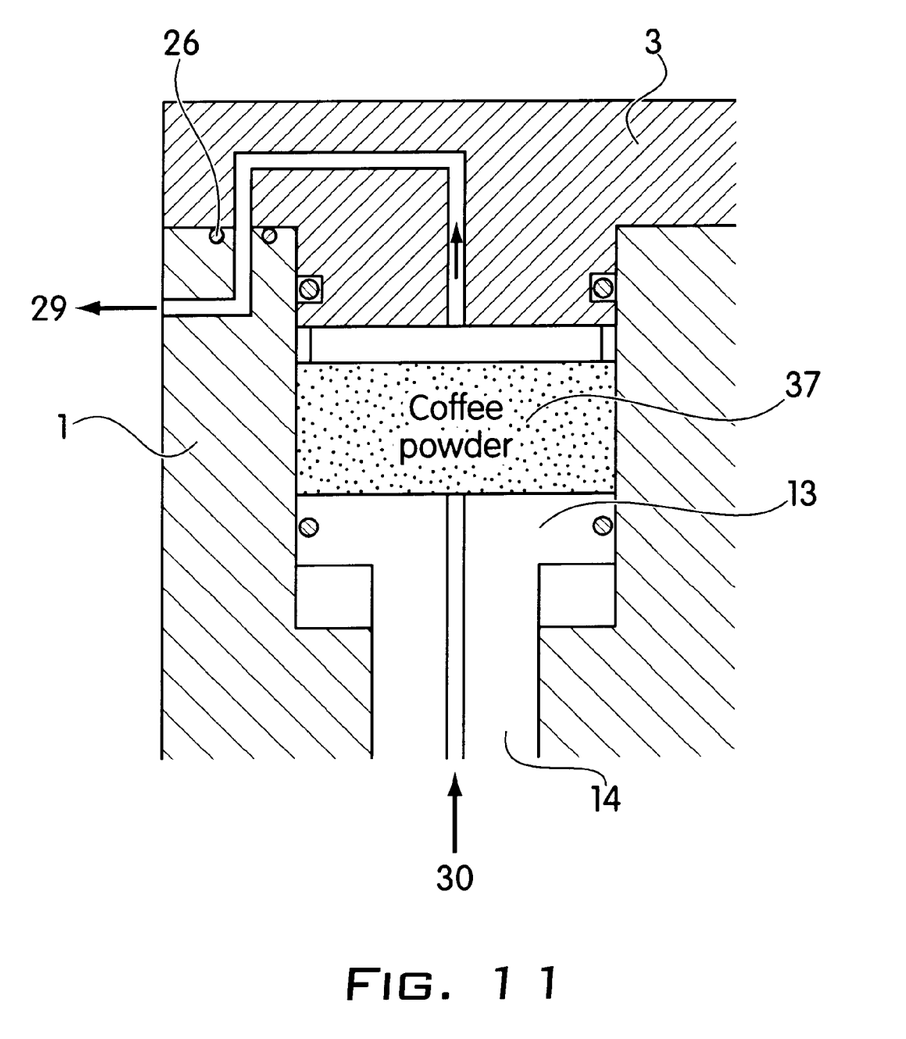
FIG. 11 is a fragmentary sectional view showing a conduit for the brewing water at the bottom end of the cylindrical chamber and a conduit for dispensing the brewed drink at the top end of the cylindrical chamber.

FIG. 11 illustrates the water delivery and espresso dispensing systems. Conduit 30 passes through spindle 14 and piston 13 to deliver water into the cylindrical brewing chamber while the brewed espresso is dispensed through conduit 29 which passes through sprinkler body 3 and the top end of cylinder housing 1. It would also be possible to pass conduit 29 only through the sprinkler body to the outside.

Figure 13:
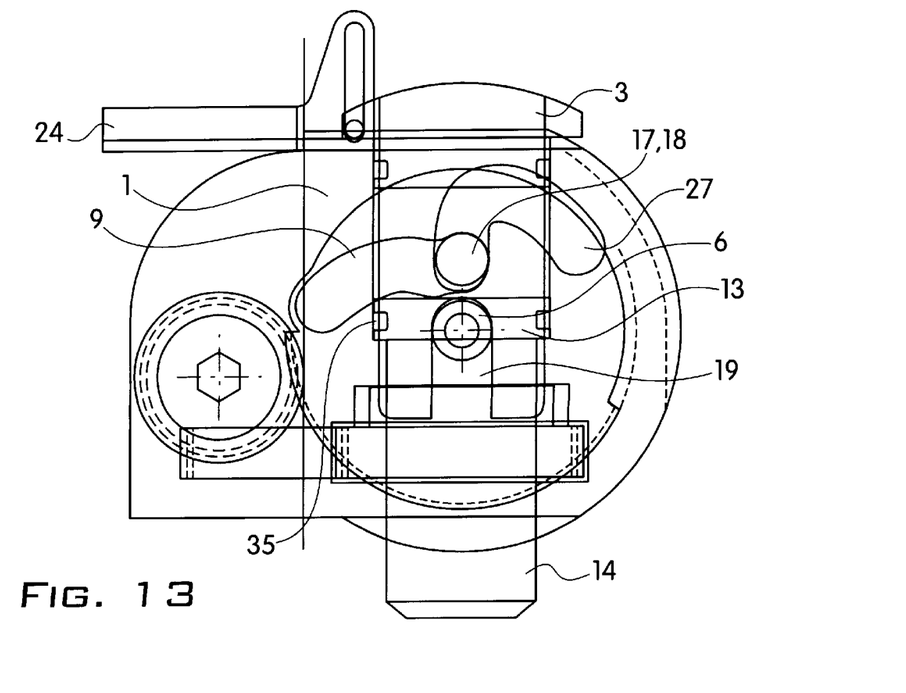

In the first operating stage illustrated in FIG. 12, sprinkler body 3 is in the same pivoted position as described in connection with FIG. 5, and piston 13 is in its lowest position. After the cylindrical brewing chamber is charged with a predetermined amount of ground coffee or coffee powder, cam disks 5 are rotated in the direction indicated by arrow 38 to align sprinkler body 3 with the axis of the cylindrical brewing chamber and to close the top end of cylinder housing 1, as shown in FIG. 13.

Figure 14:
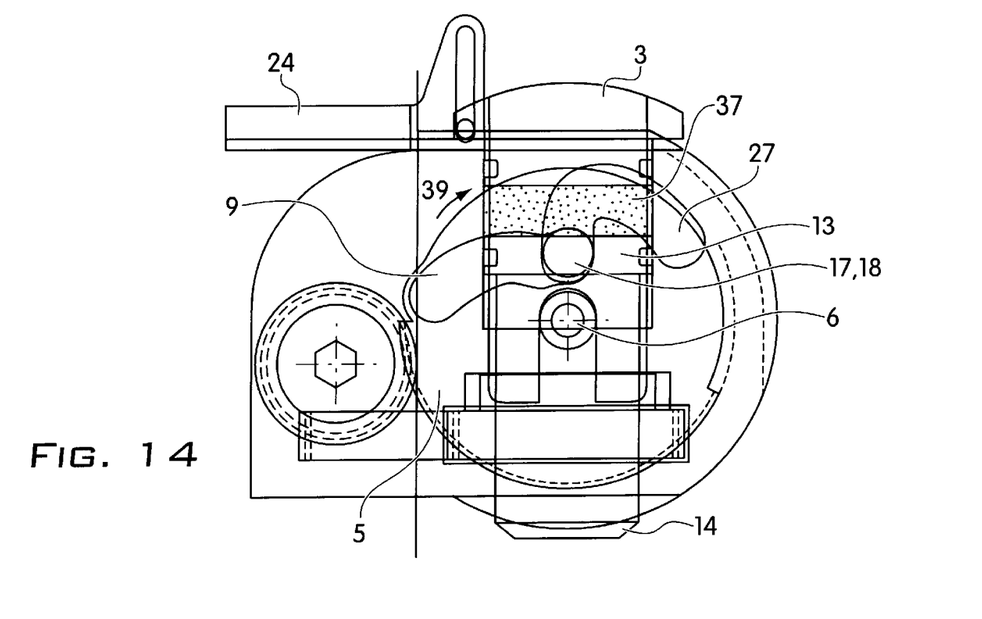

As illustrated in FIG. 14, piston 13 is axially displaced upwardly in the next brewing stage, which causes the ground coffee or coffee powder in the cylindrical brewing chamber to be compressed. Water is now delivered into the chamber through conduit 30, and after the espresso has been brewed, it may be dispensed through conduit 29.

Figure 15:
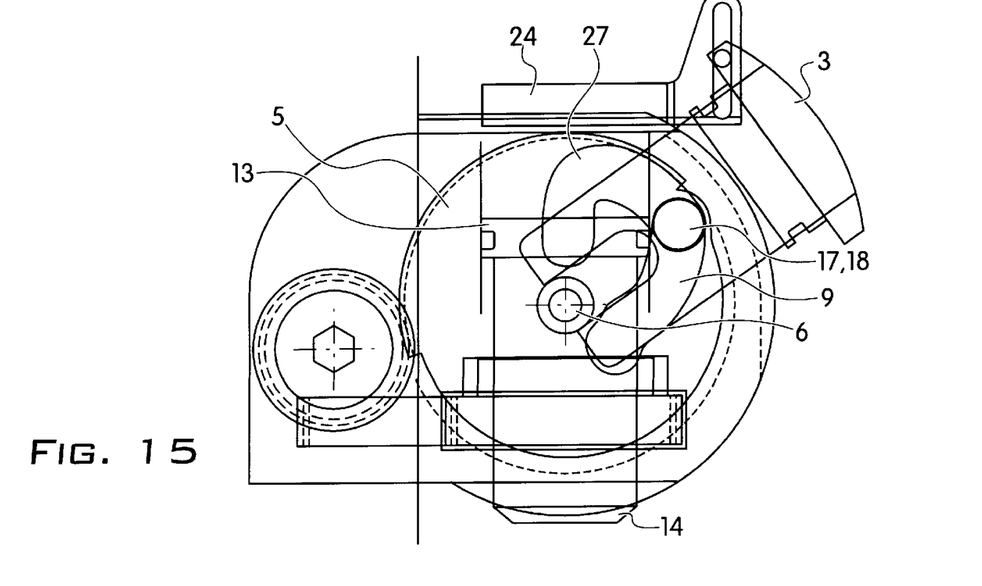
Figure 16:
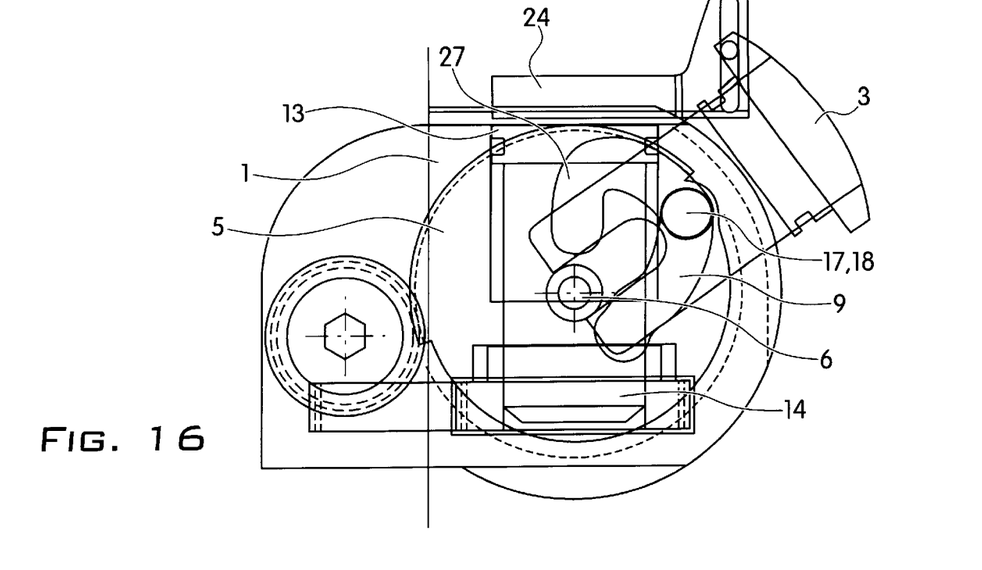
Figure 17:
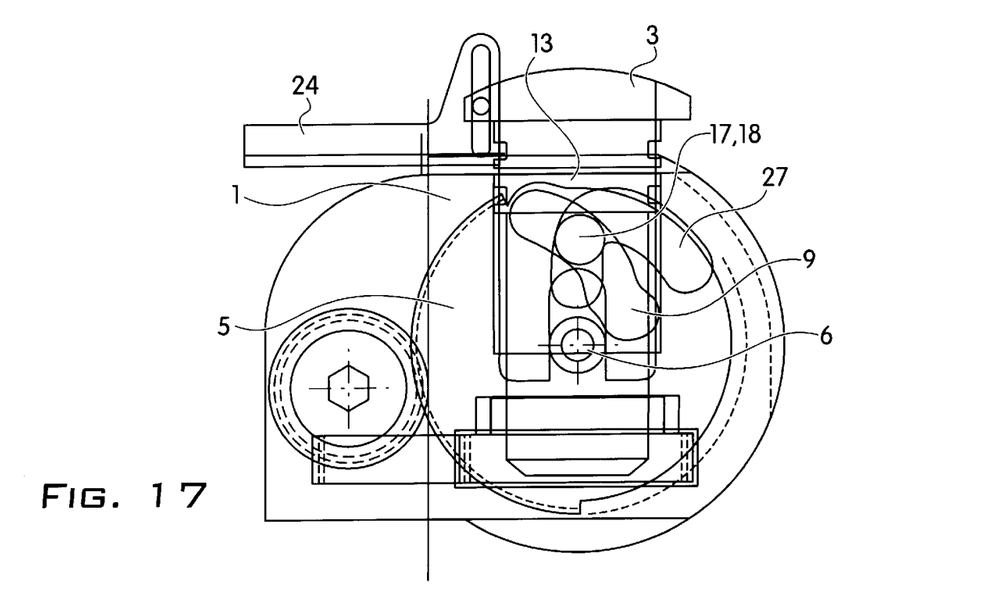

In a succeeding stage shown in FIG. 15, rotation of cam disks 5 in the direction of arrow 39 causes pivoting of sprinkler body 3 in the manner described hereinabove in connection with FIG. 8. Piston 13 is then raised into the position shown in FIG. 16 so that the surface supporting the used coffee grinds is substantially flush with the top end of cylinder housing 1. By rotating cam disks 5 counterclockwise in the direction of arrow 38, sprinkler body 3 is then pivoted back into alignment with the axis of the cylindrical brewing chamber, taking along wiper 24 pivoted to the sprinkler body, as shown in FIG. 17. After the wiper has removed the coffee grinds, the sprinkler and sieve bodies are returned to the position shown in FIG. 12.

What is claimed is:

1. A brewing device for preparing coffee or tea, which comprises
   (a) a cylinder housing having a top end and a bottom end, and defining a cylindrical brewing chamber having an axis, the cylinder housing having
      (1) two pivot pins arranged centrally between the top and bottom ends, and projecting from opposite sides of the cylinder housing orthogonally to the axis,
      (2) the opposite sides having vertically extending, flat surfaces, and
      (3) the flat surfaces defining homologous cam tracks,
   (b) a sprinkler body movable into and out of a position for closing the top end of the cylinder housing,
   (c) a sieve body movable into and out of a position for closing the bottom end of the cylinder housing, and
   (d) cam disks rotatably mounted on the pivot pins for controlling the sprinkler body movement, the cam disks defining further cam tracks.

2. The brewing device of claim 1, wherein the sprinkler body has two legs arranged on opposite sides thereof, the legs having lugs respectively engaging the homologous cam tracks in the flat surfaces of the cylinder housing and first ones of the further cam tracks in the cam disks for moving the sprinkler body into and out of the closing position.

3. The brewing device of claim 2, wherein the legs have elongated slots extending substantially parallel to the axis of the cylindrical chamber and guided by the pivot pins.

4. The brewing device of claim 2, wherein the first further cam tracks are arranged at an inside of the cam disks.

5. The brewing device of claim 1, wherein the cams disks also control the movement of the sieve body, the sieve body has two legs arranged on opposite sides thereof, the legs having lugs engaging second ones of the further cam tracks in the cam disks, said cam tracks being configured to move the sieve body substantially parallel to the axis of the cylindrical brewing chamber.

6. The brewing device of claim 5, wherein the legs have elongated slots extending substantially parallel to the axis of the cylindrical brewing chamber and guided by the pivot pins.

7. The brewing device of claim 5, wherein the second further cam tracks are arranged at an outside of the cam disks.

8. The brewing device of claim 1, wherein the cam disks have serrated circumferences.

9. The brewing device of claim 1, further comprising a transversely displaceable wiper arranged at at least one of the cylinder housing ends.

10. The brewing device of claim 9, wherein the transversely displaceable wiper is pivoted to a side of the sprinkler body.

11. The brewing device of claim 1, further comprising a conduit for supplying brewing water to the cylindrical brewing chamber, the conduit passing through the cylinder housing and the sprinkler body, and an elastomer gasket between the cylinder housing and the sprinkler body.

12. The brewing device of claim 1, further comprising means for mounting the cylinder housing on a wall.

13. The brewing device of claim 1, wherein the sieve body has a piston movable parallel to the axis of the cylindrical chamber for moving the sieve body into and out of the closing position.

14. The brewing device of claim 13, further comprising drive means for moving the piston.

15. The brewing device of claim 14, wherein the drive means comprises a spindle extending from the piston and meshing with the internal thread of a driven gear mounted in the cylinder housing.

* * * * *